US008938766B2

(12) United States Patent
Wright-Riley (10) Patent No.: US 8,938,766 B2
(45) Date of Patent: Jan. 20, 2015

(54) METHOD AND APPARATUS FOR DEFERRING TRANSMISSION OF AN SDV PROGRAM TO CONSERVE NETWORK RESOURCES

(75) Inventor: Patrick Wright-Riley, Villanova, PA (US)

(73) Assignee: General Instrument Corporation, Horsham, PA (US)

( * ) Notice: Subject to any disclaimer, the term of this patent is extended or adjusted under 35 U.S.C. 154(b) by 1222 days.

(21) Appl. No.: 11/960,562

(22) Filed: Dec. 19, 2007

(65) Prior Publication Data

US 2009/0165072 A1    Jun. 25, 2009

(51) Int. Cl.
| | | |
|---|---|---|
| *H04N 7/173* | (2011.01) | |
| *H04N 21/239* | (2011.01) | |
| *H04N 21/24* | (2011.01) | |
| *H04N 21/262* | (2011.01) | |
| *H04N 21/6405* | (2011.01) | |

(52) U.S. Cl.
CPC ....... *H04N 7/17336* (2013.01); *H04N 7/17327* (2013.01); *H04N 21/2393* (2013.01); *H04N 21/2402* (2013.01); *H04N 21/2625* (2013.01); *H04N 21/6405* (2013.01)
USPC .............................. 725/96; 725/118; 725/127

(58) Field of Classification Search
USPC ........................................................ 725/127
See application file for complete search history.

(56) References Cited

U.S. PATENT DOCUMENTS

| 7,593,326 | B2 * | 9/2009 | Collet et al. .................. 370/229 |
|---|---|---|---|
| 7,958,532 | B2 * | 6/2011 | Paul et al. ....................... 725/90 |
| 8,452,889 | B2 * | 5/2013 | Langille ........................ 709/232 |
| 8,788,534 | B2 * | 7/2014 | Hindle et al. ................. 707/793 |
| 2004/0223722 | A1 * | 11/2004 | Chamberlin et al. ........... 386/46 |
| 2007/0058924 | A1 * | 3/2007 | Yeh ................................. 386/46 |
| 2007/0143783 | A1 | 6/2007 | Wagner et al. |
| 2007/0217436 | A1 | 9/2007 | Markley et al. |
| 2007/0294717 | A1 * | 12/2007 | Hill et al. ........................ 725/25 |
| 2008/0066106 | A1 * | 3/2008 | Ellis et al. ....................... 725/40 |
| 2008/0244679 | A1 * | 10/2008 | Sukumar et al. .............. 725/121 |

OTHER PUBLICATIONS

PCT International Search Report, RE: PCT Application #PCT/US2008/086153 Dec. 10, 2008.

* cited by examiner

*Primary Examiner* — Brian T Pendleton
*Assistant Examiner* — Jonathan V Lewis
(74) *Attorney, Agent, or Firm* — Thomas A. Ward (57) ABSTRACT

A switched digital video (SDV) system is provided which includes a SDV manager for coordinating SDV sessions requested by a plurality of subscriber terminals associated with a service group. The system also includes an input for receiving SDV programming to be broadcast during the SDV sessions. At least one edge device is provided for receiving SDV programming provided by the input and for transmitting each SDV program over an access network to at least one of the subscriber terminals on one of a plurality of SDV channels. The SDV manager is configured to (i) cause transmission of at least a first requested SDV program to be delayed until a later time; and (ii) select the first requested SDV program to be delayed from among a plurality of requested SDV programs based at least in part on a current viewing and recording status of the plurality of subscriber terminals.

16 Claims, 6 Drawing Sheets

METHOD AND APPARATUS FOR DEFERRING TRANSMISSION OF AN SDV PROGRAM TO CONSERVE NETWORK RESOURCES

FIELD OF THE INVENTION

The present invention relates generally to a switched digital video system for distributing content to a subscriber over a system such as a satellite or cable television system.

BACKGROUND OF THE INVENTION

Switched digital video (SDV) refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers. Also, unlike video on-demand, which switches a singlecast interactive program to a user, switched digital video switches broadcast streams, making each stream available to one or more subscribers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on demand services.

As noted, switched digital video is largely a tool to save bandwidth. From the subscriber perspective, he or she still receives the same broadcast video service when using a switched broadcast technique; ideally the user is not able to discern that the stream was switched at all. If each one of the digital broadcast channels is being watched by subscribers in the same service group, the switched digital video approach does not yield any bandwidth savings. However, a more likely situation statistically is that only a certain number of the digital broadcast channels are being watched by subscribers in the same service group at any given time. Those channels not requested by a subscriber need not be broadcast, thereby saving bandwidth.

One way to support switched digital video is to utilize the Session Manager to manage broadcast sessions. For each channel change, the subscriber will set up a broadcast session with the Session Manager, which will determine if the requested channel is already being sent to the corresponding service group that the subscriber belongs to. The subscriber will be assigned to join the existing broadcast session if the requested channel is available at the service group or assigned to a new broadcast session if the requested channel is not available at the service group. The Session Manager will negotiate with the edge devices to allocate resources required for the session. The edge device (e.g., a digital modulator such as a QAM modulator) needs to dynamically retrieve the MPEG single program transport stream that carries the requested broadcast program (likely via IP multicast) and generate the MPEG multiple program transport stream. As part of the session setup response message, the video tuning parameters such as frequency and MPEG program number are sent back to the subscriber to access the requested broadcast channel.

When a viewer begins watching a SDV channel, the bandwidth of the QAM modulator distributing the SDV channel is reduced. That is, each time a SDV channel is bound to a QAM modulator its remaining available bandwidth decreases. Since bandwidth resources are limited, it is possible for a blocking situation to arise in which a new SDV channel cannot be bound to a QAM modulator due to lack of bandwidth. This is especially true if viewers frequently "channel surf" through "long tail" (i.e., infrequently viewed) content or turn off their television while leaving on their set top terminal so that it continues to receive a SDV channel. The increasing usage of DVRs to record programming may also adversely impact the available bandwidth if less popular programming is recorded.

DETAILED DESCRIPTION

As detailed below, when network bandwidth becomes limited so that a blocking condition may arise, an SDV program requested by a subscriber may be transmitted at a later time when more network resources become available. The SDV program is transmitted to a DVR so that the subscriber may view it at his or her convenience.

Figure 1:
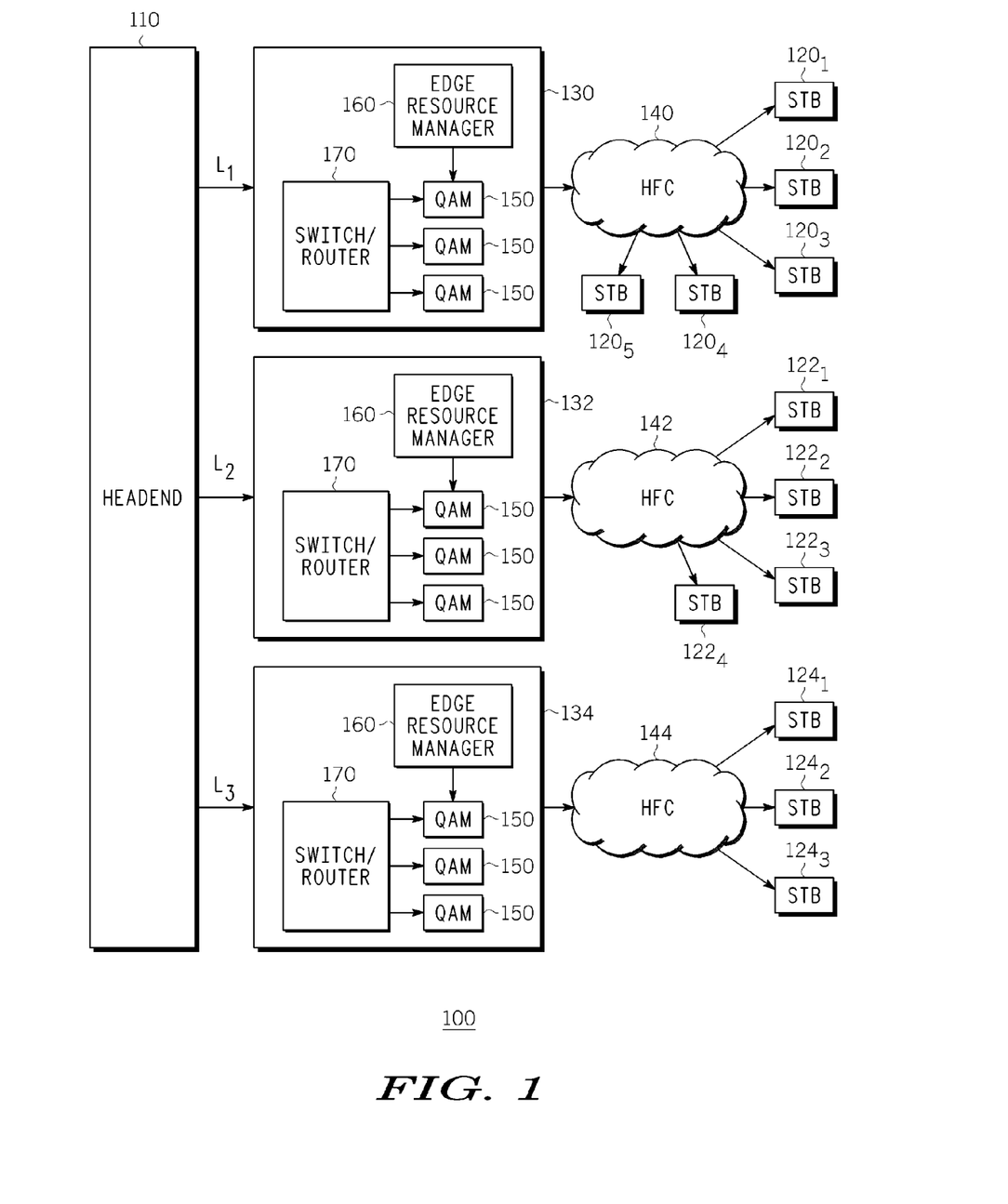
FIG. 1 shows one example of a system architecture for delivering switched digital video content to a subscriber.

FIG. 1 is a system architecture 100 for delivering switched digital channels to a subscriber during a switched digital video (SDV) session. The SDV session is implemented through a service offering in which application level data generated by a set top terminal initiates a SDV session request and an SDV manager routes data in accordance with the request to provision the service. Among other components, system architecture 100 comprises a content source such as a headend 110 that is connected to multiple intermediate entities such as hubs 130, 132, and 134. The headend 110 communicates with a switch or router 170 in hubs 130, 132, and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicate with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set top terminals $120_1$, $120_2$, $120_3$, $120_4$ and $120_5$, access network 142 communicates with set top terminals $122_1$, $122_2$, $122_3$ and $124_4$, and access network 144 communicates with set top terminals $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Each hub 130, 132 and 134 also includes an edge resource manager 160 for allocating and managing the resources of the edge devices 150. The edge resource manager 160 communicates with and receives instructions from the session manager located in the headend 110.

Figure 2:
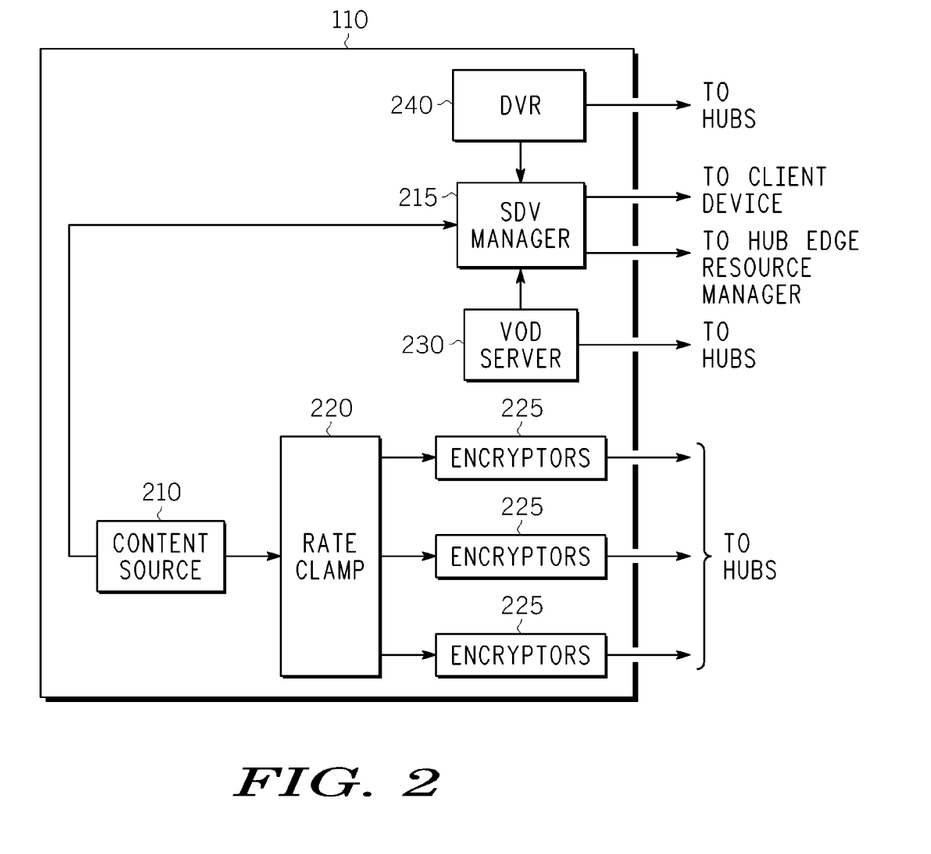
FIG. 2 shows one example of the headend depicted in FIG. 1.

FIG. 2 shows one example of headend 110. The headend 110 includes a broadcast content source 210, which may include, by way of example, satellite receivers, off-air receivers and/or content storage devices such as servers. A SDV manager 215 is used to determine which SDV transport streams are being transmitted at any time and for directing the set top terminals to the appropriate stream. The SDV manager 215 also keeps track of which subscribers are watching which channels and it communicates with the edge resource managers 160 in the hubs so that the content can be switched on and off under the control of the SDV manager 215. In addition, all subscriber requests for a switched digital channel go through the SDV manager 215. The switched digital channels are forwarded to a rate clamp 220 and one or more encryptors 225 using, for example, IP multicast addressing. The content is then encrypted by the encryptors 225 and transmitted to the appropriate hub or hubs. Typically, standard definition (SD) channels are currently rate clamped to 3.75 Mbps while high definition channels are currently rate clamped to between about 12 Mbps and 15 Mbps. The encryptors 225 encrypt the digitally encoded content, often under the control of a conditional access system (not shown).

Headend 110 may also include a network DVR 240. The network DVR 240 stores content that can be transmitted to set top terminal via a hub and access network in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

It should be noted that in some cases the functionality of some or all of the SDV manager 215 may be transferred to each of the hubs 130, 132 and 134. For example, the determination of which SDV programs to defer for later transmission may be made at the hubs.

Headend 110 may also include a variety of other components for offering additional services. For example, in FIG. 2 a video on demand (VOD) server 230 is shown for storing programs or other content for distribution to subscribers on an on-demand basis. Although not shown, one of ordinary skill in the art would recognize that other components and arrangements for achieving the various functionalities of headend 110 are possible. For example, the headend 110 may comprise typical headend components and services including a billing module, an advertising insertion module, a subscriber management system (SMS), a conditional access system and a LAN(s) for placing the various components in data communication with one another. It will also be appreciated that the headend configuration depicted in FIG. 2 is a high-level, conceptual architecture and that each network may have multiple headends deployed using different architectures.

When a viewer selects an SDV channel using a subscriber terminal such as a set top terminal, the SDV system actively switches the channel onto one of the QAMs that serves that particular set top terminal. The set top terminals are generally arranged into service groups and each of the service groups is assigned to, and serviced by, one or more QAM modulators. For example, in the arrangement depicted in FIG. 1 set top terminals $120_1$, $120_2$, $120_3$, $120_4$ and $120_5$ are assigned to QAM modulators 150 located at hub 130, set top terminals $122_1$, $122_2$, $122_3$ and $122_4$ are assigned to QAM modulators 150 located at hub 132, and set top terminals $124_1$, $124_2$ and $124_3$ are assigned to QAM modulators 150 located at hub 134. Typically, four (4) or eight (8) QAM modulators are deployed per service group to carry the SDV channels. SDV service groups currently include from about 500 to 1000 set top terminals. Depending on the system topology, there may or may not be a one-to-one correspondence between the hubs and the service groups. For instance, it is typically the case that each hub serves multiple service groups.

As previously mentioned, situations can arrive when the bandwidth of the QAM modulator or modulators assigned to a service group becomes sufficiently limited so that a blocking situation may arise, thereby preventing any additional SDV channels from being supplied to that service group. The SDV manager or other suitable entity can be used to determine when such a blocking situation occurs or may soon occur by tracking or monitoring the bandwidth usage of each service group. For example, in the headend depicted in FIGS. 1 and 2, SDV manager 215 can receive bandwidth utilization information directly from the rate clamp 220. Alternatively, in some cases the SDV manager can monitor the QAM modulators 150 and/or set top terminals so that is knows which SDV channels are currently being utilized and when new SDV channels are requested. The SDV manager 215 can also direct the rate clamp 220 to adjust the bit rate as necessary based on the bandwidth information it obtains from the QAM modulators or the set top terminals.

When a subscriber requests an SDV program at a time when network resources have limited or no availability, the SDV system may defer transmission of the program to the subscriber until a later time by, for instance, storing the program on network DVR 240. When more network resources are subsequently available (e.g., when network resource usage falls below a threshold value), the program can be provided to the subscriber's DVR so that the subscriber can view the program at his or her convenience. In this way limited network resources are conserved at times of high demand so that a blocking situation can be avoided.

Ideally, if several SDV programs are being requested by different subscribers and one (or more) of them needs to be deferred, the SDV program that is selected will be the one for which a delay in transmission least impacts the subscriber. Such a program can be selected in a variety of different ways. For example, if the subscriber is recording the program and not actively viewing it as it is being transmitted, the impact on the subscriber caused by delaying transmission presumably will be minimal. Accordingly, an SDV program that is being downloaded by a subscriber to a DVR may be the first one to be deferred to prevent blocking. On the other hand, if these are no available subscribers who are recording and not actively viewing the SDV program, it may be necessary to defer an SDV program that is being recorded and actively viewed. Finally, there may still be times when the SDV system cannot fulfill a request for an SDV program that is in fact being actively watched by the subscriber which is not being recorded. Delaying these SDV programs will typically be the most disruptive to the subscriber and thus generally will be the last program to be deferred.

Of course, when delaying selected SDV programs based on the current viewing and recording status of the subscriber as described above, the SDV manager needs to be aware of this status. This information is readily available. In a SDV system the set top terminal regularly provides status information to the SDV manager, including tuning information, DVR activity information, and the like. For instance, if a set top terminal is configured by the subscriber to record a program while the set top terminal is tuned so that it is currently playing a program on a different channel, the subscriber is clearly recording the program for later viewing. On the other hand, if a set top terminal is configured by the subscriber to record a program and the set top terminal is tuned to the same program, the subscriber is more likely to be actively watching the program and for purposes herein may be treated as actually viewing the program. This various status information is provided to the SDV manager.

When a requested SDV program is to be deferred, the DVR in the subscriber terminal is notified (using, e.g, a flag or dedicated bit in a control message) so that it can readjust its recording schedule accordingly in order to receive the content stored on the network DVR 240. In addition, a message can be transmitted to the subscriber which will appear on the subscriber's display. The message notifies the subscriber that the program will be delayed until a later time at which it will be transmitted to the subscriber's DVR. In some cases, if possible, an estimate of the transmission time may also be included in the message. Such a message will generally also be provided to a subscriber who is recording but not actively viewing the SDV program.

Instead of storing the requested SDV program on the subscriber's local DVR, the program may be stored on the network DVR 240 located at the headend 110 (see FIG. 2). If the SDV manager 215 determines that the subscriber is planning to record a requested SDV program on his local DVR and is not actively watching it, in some cases the SDV manager 215 will not transmit the SDV program to the subscriber but will simply record it to the network DVR 240 for subsequent viewing. Alternatively, if at a time when network resources are low and the subscriber is requesting an SDV program that is to be actively viewed and not recorded, the SDV manager 215 can notify the subscriber that the program will be forwarded to the network DVR 240 so that it will be available for viewing at a later time when network resources are not as limited.

Figure 3:
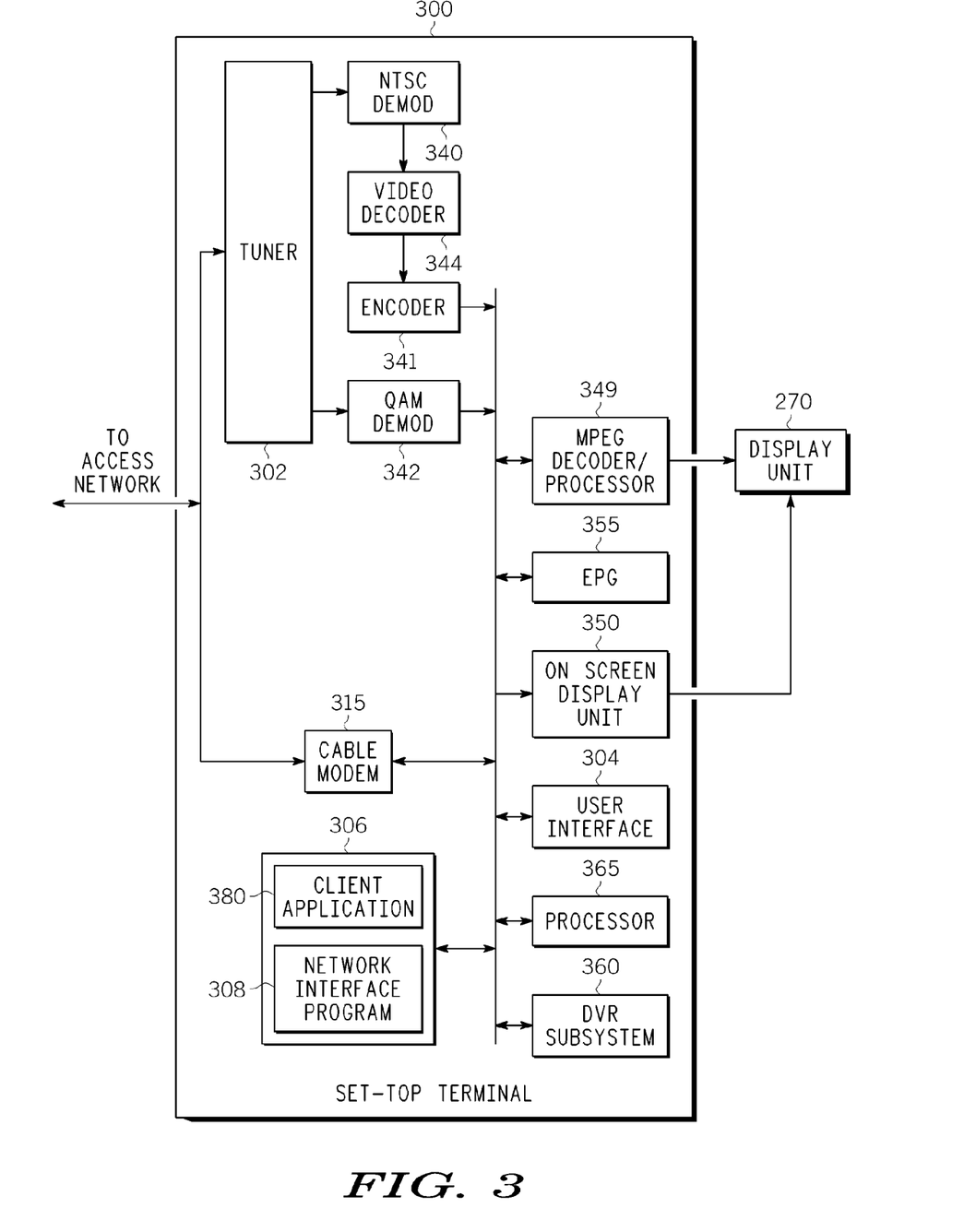
FIG. 3 shows one example of a set top terminal.

One example of a set top terminal 300 is shown in more detail in FIG. 3. It should be noted that set top terminal 300 more generally may be any apparatus such as a hardware card, specially programmed computer or other device having the functionality described herein that may be placed near to or within a television or other display device (such as a computer monitor) such as display unit 370. The set top terminal 300 receives content from cable access networks seen in FIG. 1. Broadly speaking, a traditional set top terminal such as that depicted in FIG. 3 is a device that can receive, store and forward content without manipulating the content in any significant way except to format it so that it may be rendered in a suitable manner.

Set top terminal 300 includes an in-band tuner 302, which tunes to a channel signal selected by a consumer (not shown) via user interface 304. User interface 304 may be any control device such as a remote control, mouse, microphone, keyboard, or display. NTSC demodulator 340 and digital demodulator 342 are responsive to in-band tuner 302. NTSC demodulator 340 includes components responsive to receive analog versions of a channel signal. A digital demodulator 342, which as shown is a QAM demodulator, but, which may be any type of digital demodulator device, includes components responsive to receive digital versions of a channel signal, and to output video information. QAM demodulator 342 receives and processes digital data packets from one or more digital sources, such as a digital television signal, an MPEG transport stream, or a media stream from an external network connection, such as cable modem 315 (if available), using well-known methods and techniques. Video decoder 344 is responsive to receive and decode video information. Video information that may require format translation or modification for compatibility with capabilities of set top terminal 300 may be passed to encoder 341 for formatting. Video information that is in a format preferred for use by MPEG Decoder/Multi Media Processor 349 may be passed directly to MPEG Decoder/Multi Media Processor 349. Encoder 341 is operative to perform predetermined coding techniques (for example, MPEG-2, MPEG-4, and others) to produce an encoded video signal for transmission to MPEG Decoder/Multi Media Processor 349, or for storage. MPEG Decoder/Multi-Media Processor 349 is operative to perform predetermined coding techniques to arrange video information into displayable formats, in accordance with well-known methods and techniques. Internal arrangements of MPEG Decoder/Multi-Media Processor 349 are well known, and may include analog-to-digital converters, one or more storage media and/or buffers, and general or special-purpose processors or application-specific integrated circuits, along with demultiplexers for demultiplexing and/or synchronizing at least two transport streams (for example, video and audio).

An electronic program guide (EPG) 355 is also provided in set top terminal 300. The EPG 355 is an interactive, on-screen display feature that displays information analogous to TV listings found in local newspapers or other print media. An EPG provides information about each program being broadcast within the time period covered by the EPG, which typically ranges from the next hour up to several days. The information contained in an EPG includes programming characteristics such as, for example, channel number, program title, start time, end time, elapsed time, time remaining, a brief description of the program's content and possibly the names of individuals associated with the program such as the actors, writers and director. The EPG, which is generally received along with the programming content, may be updated on a periodic basis so that the consumer can make appropriate selection for upcoming programs. For example, the electronic program guide 355 may display programs in a tabular format by channel and time so that the user can make selections of desired content. In some cases, instead of transmitting it along with the programming, the electronic program guide 355 may be downloaded via a telephone line, cable connection, satellite up-link, or radio broadcast antenna.

An on-screen display unit 350 is provided in set top terminal 300. The on-screen display unit 350 is used to display information such as control menus and the like as well as information received from the service provider or MSO that needs to be directly presented to the user regardless of the particular programming or channel that the user is currently viewing. In particular, on-screen display unit 350 displays the information provided by the EPG 355. Accordingly, on-screen display unit 350 can forward the information directly to the display unit 370, where it may appear as an overlay, pop up, or scrolling text ticker that is superimposed on the current programming being viewed. Alternatively, the information from the on-screen display unit 350 may even replace the current programming that appears on the display unit 370.

DVR subsystem 360 is provided for recording programs received from the access network. DVR subsystem 360 can control the channel tuned by tuner 302 and record programming on a manual or timer control basis. Additionally, the DVR subsystem 360 can buffer incoming programs to enable a view to pause or replay a portion of a live program.

Set top terminal 300 further includes a computer-readable storage medium 306. Computer-readable storage medium 306 may be any local or remote device capable of recording or storing data, and in particular may be, or may include, a read only memory ("ROM"), flash memory, random access memory, a hard disk drive, all types of compact disks and digital videodisks, and/or magnetic tape. Various application programs may reside on storage medium 306. The applications residing on storage medium 306 may be computer programs that include software components implemented according to well-known software engineering practices for component-based software development and stored in computer-readable memories, such as storage medium 306. The applications, however, may be any signal processing methods and/or stored instructions, in one or more parts, that electronically control functions set forth herein. Storage medium 306 may also include other programs to provide additional functionality. For example, a network interface program 308 may be provided that represents aspects of the functional arrangement of various computer programs that pertain to the receipt and processing of content and other data over a broadband system.

The various components of set top terminal 300 discussed above may all operate under the overall control of a processor 365. Moreover, it is contemplated that the processor 365, tuner 302, video decoder 349, user interface 304, onscreen display unit 350 and the other components shown in FIG. 3 may each be implemented in hardware, software or a combination thereof. In addition, although the various components are shown as separate processors, it is contemplated that they may be combined and implemented as separate processes on one or more processors.

Generally speaking, an SDV system may be used by two sets or groups of users. One group is current users. A current user is one who previously requested content and is now receiving the content though his set top terminal using resources that have already been provisioned. In general, as the number of current users goes up, the number of new users who can be added to the system goes down when the individuals in the group of current users are receiving different programs. The other group is requesting users. These users have not yet received content, but are requesting the SDV system to provision resources. As an example, suppose at 7:55 pm a user wants to receive and watch program X that starts at 8:00. At 7:55, that user is a requesting user. If resources are available, the requesting users' set top terminal will receive the content associated with that content source (e.g., channel) and thus become a current user once the resources are provisioned shortly after 7:55. Accordingly, a set of users could encompass (I) requesting users (II) current users or (III) a combination of both requesting and current users.

Figure 4:
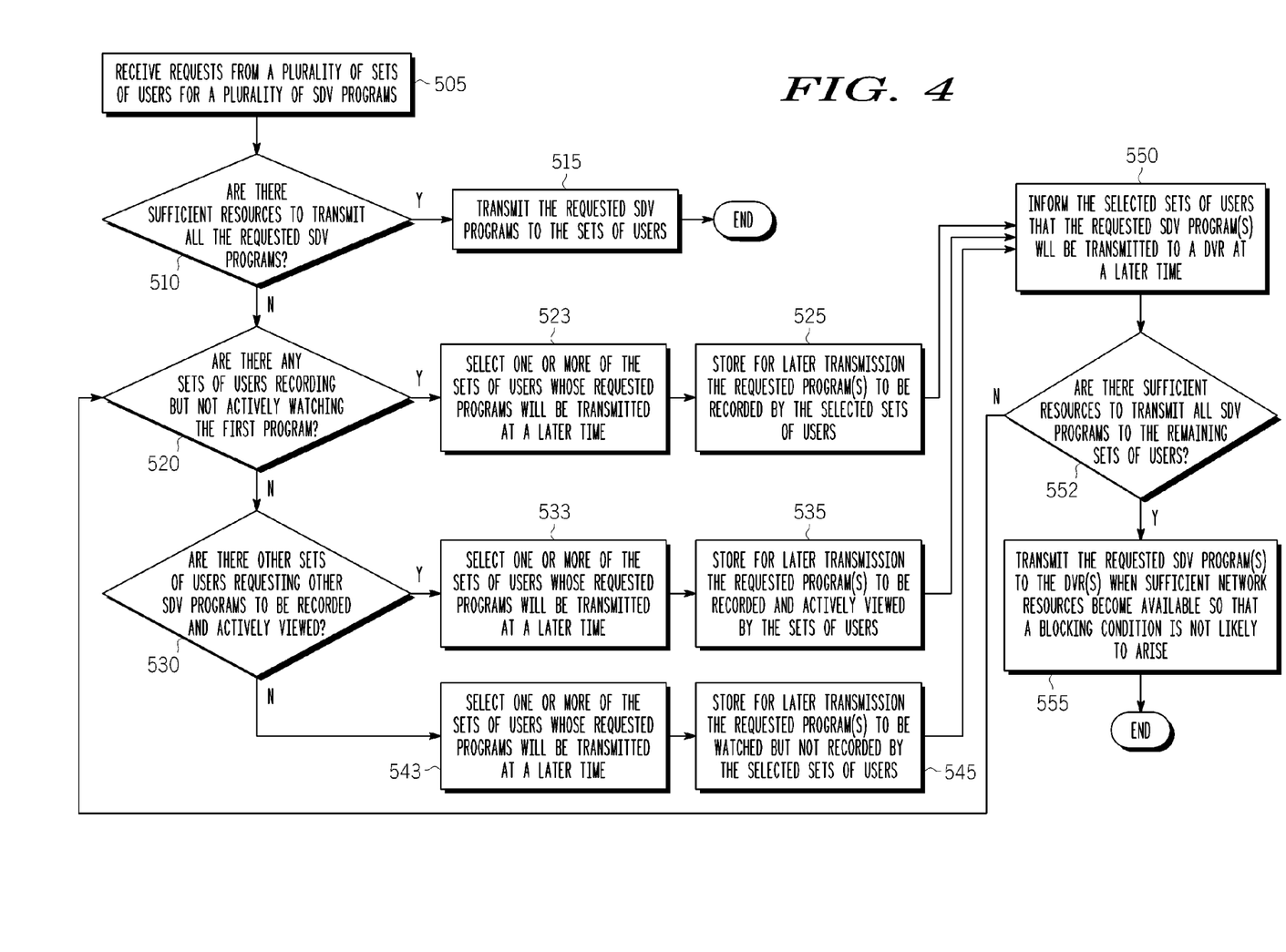
FIG. 4 is a flowchart showing one example of a method by which the SDV manager or other appropriate entity prevents a blocking situation from arising in an SDV system.

FIG. 4 is a flowchart showing one example of a method by which the SDV manager or other appropriate entity prevents a blocking situation from arising in an SDV system. In this example multiple concurrent requests are received from multiple sets of subscribers or users and the SDV manager needs to prioritize the incoming requests in the event that there are insufficient network resources available to fulfill them all. That is, this method need not involve current users. The method begins at step 505 when the SDV manager receives at essentially the same time two or more requests from two or more sets of users for a first SDV program. In step 510 the SDV manager determines if there are sufficient resources to transmit all the requested SDV programs, and, if so, the programs are transmitted to the sets of users in step 515. On the other hand, if there are not sufficient resources to transmit the program, the SDV manager first determines in step 520 if any of the sets of users are requesting SDV programs to be recorded but not actively watched. If so, then in step 523 one or more of these sets of users are selected to have their requested programs deferred for later transmission. The requested program(s) to be recorded by the selected users(s) are then stored for later transmission in step 525. If there are no sets of users recording the programs they request, then in step 530 the SDV manager determines if there are any other sets of users requesting other SDV programs that are to be recorded and actively viewed. If so, then in step 533 one or more of these sets of users are selected to have their requested programs deferred for later transmission. The requested program(s) to be recorded and actively viewed by the selected users (s) is then stored for later transmission in step 535. However, if there are no sets of users requesting a SDV program that is to be recorded (thereby implying that the remaining sets of users simply plan on watching an SDV program), then in step 543 one or more of these sets of users are selected to have their requested programs deferred for later transmission. The requested program(s) to be actively viewed but not recorded by the selected users (s) are then stored for later transmission in step 545. If an SDV program is to be delayed in any of the preceding steps, then in step 550 the subscriber terminal(s), and possibly the user's themselves, who are impacted are notified that the requested SDV programs will be transmitted to their local DVR at a later time. In step 552 the SDV manager determines if there are sufficient resources to transmit SDV programming to all the remaining sets of users. If so, the method proceeds to step 555. If not, then the method returns to step 520 for the remaining sets of users. Finally, in step 555, the requested SDV program(s) are transmitted to the user's DVR or a network DVR when sufficient network resources become available so that a blocking condition is not likely to arise.

It should be noted that a user in a service group that is already receiving a particular SDV program or channel need not proceed through the flowchart depicted in FIG. 4 if the user is requesting that particular SDV program or channel since it is already available to that service group.

When selecting individual subscribers or users for deferred transmission of the requested SDV programs in steps 523, 533 and 543, a variety of factors may be considered. The factors that are considered will often be factors indicating that a delay in receipt of the requested program will disrupt one subscriber less than another subscriber. That is, the selected subscriber will generally be the subscriber who is least likely to be impacted by the delay. For instance, if one subscriber is requesting a program that is transmitted live, such as in the case of many sporting events or new programming, these programs may take precedence over programs that have been previously recorded or even previously broadcast. As another example, if one particular SDV program is being requested by more subscribers than another SDV program, the SDV program being requested by fewer subscribers will generally be the program that is deferred since the extra bandwidth needed to transmit programming to multiple subscribers is often minimal.

As in the example presented in connection with FIG. 4, it will generally be the case that a subscriber who is currently receiving an SDV program will not be interrupted to allow a new request from a subscriber to be fulfilled. That is, FIG. 4 is generally applicable only to requesting subscribers or users. However, this need not necessarily be the case. For instance, if a subscriber requests an SDV program and that subscriber is highly likely to be disrupted if the request is not fulfilled, then if there are no other alternatives, it may be best to interrupt an SDV program that is being provided to a subscriber who is only recording and not watching the SDV program. The transmission of SDV program to the subscriber's DVR can then be resumed at a later time, either at the point in the program where it was interrupted or at the beginning of the program.

Figure 5:
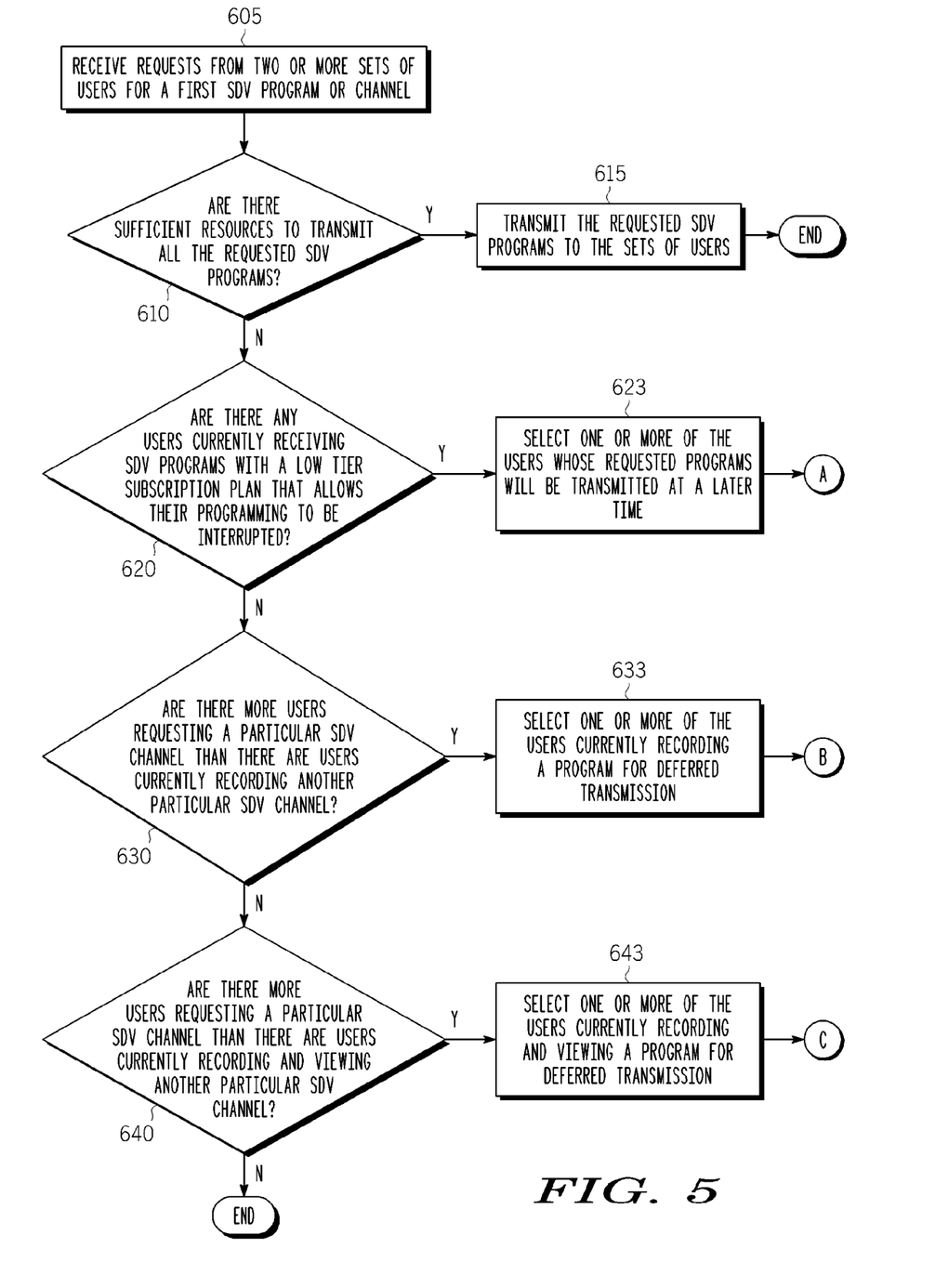
FIGS. 5 and 6 are a flowchart showing another example of a method by which the SDV manager or other appropriate entity prevents a blocking situation from arising in an SDV system.
Figure 6:
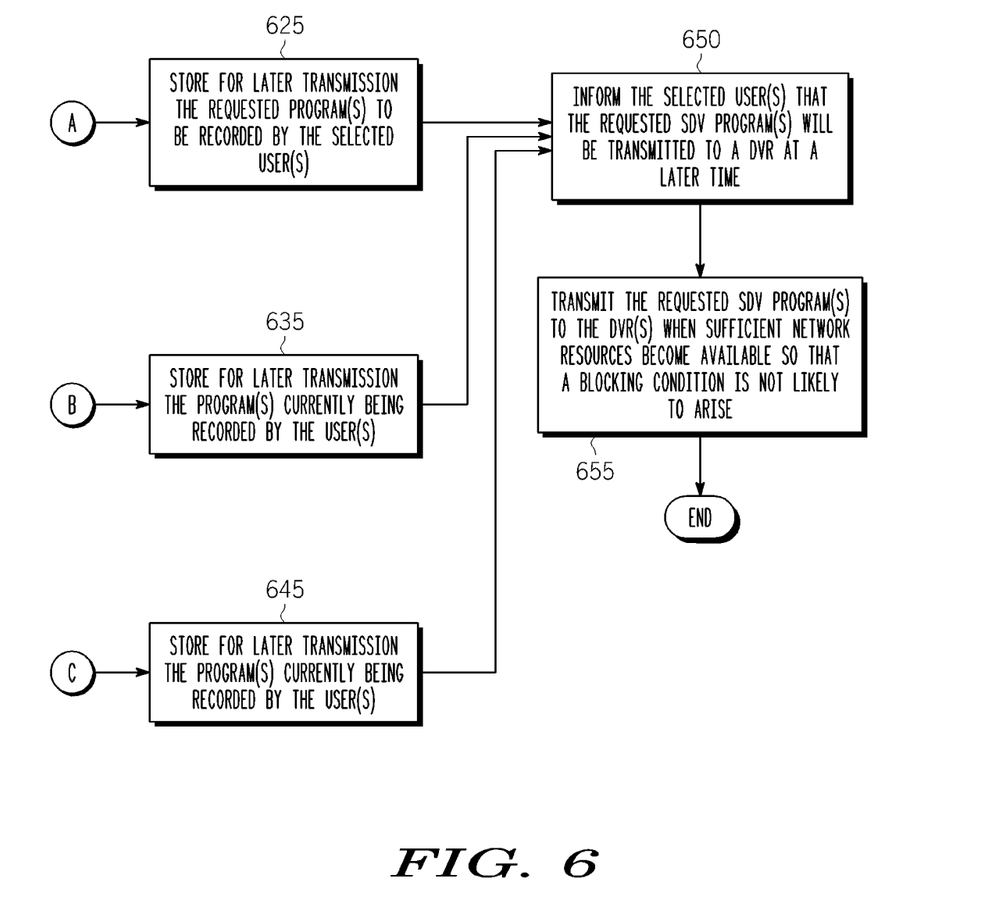

FIGS. 5 and 6 are a flowchart showing one example of a method in which newly received requests for SDV programming may be fulfilled at the expense of subscribers or users who are already receiving an SDV channel. Similar to the method of FIG. 4, the method of FIGS. 5 and 6 begins at step 605 when the SDV manager receives two or more requests from two or more users or sets of users for a first SDV program or channel. In step 610 the SDV manager determines if there are sufficient resources to transmit all the requested SDV programs, and, if so, the programs are transmitted to the users in step 615. On the other hand, if there are not sufficient resources to transmit the program, the SDV manager first determines in step 620 if any users who are already receiving SDV programming have a lower tier subscription plan that gives priority to subscribers with a higher tier subscription plan. That is, in return for a reduction in the cost of their subscription plan, subscribers with a lower tier subscription plan agree to have their SDV programming interrupted if bandwidth becomes limited and there are subscribers with a higher tier subscription plan requesting SDV programming. If there are such lower tier subscribers receiving SDV programming, then in step 623 one or more of these users are selected to have their requested programs deferred for later transmission. The requested program(s) to be recorded by the selected users(s) are then stored for later transmission in step 625. If there are no lower tier users receiving SDV programming, or if the number of lower tier users receiving SDV programming is insufficient to fulfill the newly received requests, then the process proceeds to step 630. In step 630, the SDV manager compares the number of users newly requesting the first SDV program with the number of users currently recording but not viewing any other single SDV program. For instance, if only one subscriber is currently recording program "abc" and there are 10 users newly requesting program "xyz," the user viewing program abc may be interrupted so that the requests for program xyz can be fulfilled for the 10 users. If the number of newly requesting users is greater, then in step 633 the user currently recording program abc is selected to have the programs interrupted and deferred for later transmission. Program abc is then stored for later transmission in step 635. However, if there are no users requesting a SDV program that is to be recorded which can be deferred in step 630, then in step 640 the SDV manager compares the number of users newly requesting the first SDV program with the number of users currently viewing as well as recording any particular SDV program. If the number of newly requesting users is greater, then in step 643 one or more of these users are selected to have their requested programs interrupted and deferred for later transmission. The interrupted program(s) is then stored for later transmission in step 645. If an SDV program is to be delayed in any of the preceding steps, then in step 650 the user(s) who are impacted are notified that the interrupted SDV programs will be transmitted to their local DVR at a later time. Finally, in step 655, the interrupted SDV program(s) are transmitted to the user's DVR or a network DVR when sufficient network resources become available so that a blocking condition is not likely to arise.

The processes described above, including but not limited to those presented in connection with FIGS. 4, 5 and 6, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The invention claimed is:

1. At least one non-transitory computer-readable medium encoded with instructions which, when executed by a processor, performs a method including:
   receiving a plurality of requests to transmit SDV programming over an access network from a plurality of subscriber terminals associated with a service group;
   monitoring network resources used to provide the SDV programming to the plurality of subscriber terminals;
   prioritizing the plurality of requests when the monitored network resource usage decreases below a threshold amount;
   causing transmission of at least one requested SDV program of the of the plurality of requests to be deferred, until a later time based upon the prioritization; and
   selecting the SDV program to be deferred among a plurality of requested SDV program based at least in part on the prioritization, wherein the prioritization is further based upon a current viewing and recording status of the plurality of subscriber terminals.

2. The non-transitory computer-readable medium of claim 1 further comprising forwarding the at least one requested SDV program over the access network to a DVR associated with at least one subscriber terminal of the plurality of subscriber terminals.

3. The non-transitory computer-readable medium of claim 2 wherein the DVR is a subsystem of the at least one subscriber terminal.

4. The non-transitory computer-readable medium of claim 1 wherein the designated DVR is a network-based DVR.

5. The non-transitory computer-readable medium of claim 1 further comprising determining that network resources available for providing SDV programming are limited to cause a blocking condition to arise and deferring the transmission of the at least one requested SDV program when such a determination is made.

6. The non-transitory computer-readable medium of claim 5 wherein the network resources include network bandwidth.

7. The non-transitory computer-readable medium of claim 6 wherein the requested SDV program will be forwarded to the designated DVR when sufficient bandwidth is available to transmit the at least one requested SDV program over the access network without causing the blocking condition to arise, wherein the designated DVR is a DVR associated with the at least one subscriber terminal.

8. The non-transitory computer-readable medium of claim 1 further comprising determining that network resources for providing SDV programming are limited to cause a blocking condition to arise and deferring the transmission of the at least one requested SDV program when such a determination is made and when the at least one requested SDV program is not to be actively viewed while local recording takes place.

9. The non-transitory computer-readable medium of claim 1 wherein the selected SDV program is a program that is to be recorded by a user whose subscriber terminal is currently tuned to a channel different from a channel on which the selected SDV program is provided.

10. The non-transitory computer-readable medium of claim 1 wherein, if no requested SDV programs are to be recorded, selecting for deferred transmission a requested SDV program to be viewed by a subscriber whose subscriber terminal is tuned to, but not recording, a channel on which the selected SDV program is provided.

11. The non-transitory computer-readable medium of claim 1 wherein the message informs a user that the at least one requested SDV program will be available from a designated DVR at a later time.

12. A switched digital video (SDV) system, comprising:
a SDV manager for coordinating SDV sessions requested by a plurality of subscriber terminals associated with a service group;
an input for receiving SDV programming to be broadcast during the SDV sessions;
at least one edge device for receiving SDV programming provided by the input and for transmitting each SDV program over an access network to at least one of the subscriber terminals on one of a plurality of SDV channels; and
wherein the SDV manager is configured to (i) prioritize the SDV sessions requested by the plurality of subscriber terminals based at least in part on a current viewing and recording status of the plurality of subscriber terminals (ii) cause transmission of at least a first requested SDV program to be delayed until a later time and select the first requested SDV program to be delayed from among a plurality of requested SDV programs based upon the prioritization.

13. The switched digital video system of claim 12 wherein the SDV manager is further configured to monitor network resources used to provide SDV programming to the plurality of subscriber terminals associated with a service group; and cause the transmission of the first requested SDV program to be deferred until a later time when the monitored network resource usage falls below a threshold value.

14. The switched digital video system of claim 12 wherein the SDV manager is further configured to cause the first requested SDV program to be forwarded over the access network to a DVR associated with a first subscriber terminal.

15. The switched digital video system of claim 12 wherein the first requested SDV program is a program that is to be recorded by a user whose subscriber terminal is currently tuned to a channel different from a channel on which the first SDV program is provided.

16. The switched digital video system of claim 12 wherein, if no requested SDV programs are to be recorded, the first requested SDV program is a program being viewed by a user whose subscriber terminal is tuned to, but not recording, a channel on which the first SDV program is provided.

* * * * *